US009723247B2

(12) United States Patent
Tranchina et al.

(10) Patent No.: US 9,723,247 B2
(45) Date of Patent: *Aug. 1, 2017

(54) VEHICLE ENTERTAINMENT TABLET UNIT AND CRADLE

(71) Applicant: VOXX INTERNATIONAL CORPORATION, Hauppauge, NY (US)

(72) Inventors: James R. Tranchina, Dix Hills, NY (US); Patrick M. Lavelle, Sayville, NY (US); Raymond Ford, Pinehurst, NC (US)

(73) Assignee: VOXX INTERNATIONAL CORPORATION, Hauppauge, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/095,875

(22) Filed: Apr. 11, 2016

(65) Prior Publication Data

US 2016/0227155 A1 Aug. 4, 2016

Related U.S. Application Data

(63) Continuation of application No. 14/605,101, filed on Jan. 26, 2015, now Pat. No. 9,310,842, which is a (Continued)

(51) Int. Cl.
H04N 5/64 (2006.01)
B60N 2/48 (2006.01)
(Continued)

(52) U.S. Cl.
CPC ............ H04N 5/64 (2013.01); B60N 2/4876 (2013.01); B60R 11/0235 (2013.01);
(Continued)

(58) Field of Classification Search
None
See application file for complete search history.

(56) References Cited

U.S. PATENT DOCUMENTS 7,245,274 B2 * 7/2007 Schedivy ............. B60N 2/4876
345/7
7,636,930 B2 12/2009 Chang
(Continued)

OTHER PUBLICATIONS

Office Action for U.S. Appl. No. 13/340,946 Dated Mar. 14, 2014.
(Continued)

*Primary Examiner* — Heather Jones
(74) *Attorney, Agent, or Firm* — F. Chau & Associates, LLC.

(57) ABSTRACT

A vehicle entertainment system includes a tablet unit and a cradle. The tablet unit includes a display and a touch screen input device disposed on a front surface, a first electrical connection, a first mounting mechanism, and a wireless receiver. The wireless receiver is configured to receive media data from a wireless network and the touch screen input device is configured to receive input from a user. The cradle is disposed in a headrest in a vehicle and includes a second electrical connection and a second mounting mechanism. The tablet unit is electrically connected to the cradle via the first and second electrical connections, and is physically coupled to the cradle via the first and second mounting mechanisms upon mounting the tablet unit to the cradle.

20 Claims, 7 Drawing Sheets

Related U.S. Application Data continuation of application No. 13/340,946, filed on Dec. 30, 2011, now Pat. No. 8,953,102, which is a continuation-in-part of application No. 12/851,433, filed on Aug. 5, 2010, now Pat. No. 8,713,613, which is a continuation-in-part of application No. 12/570,517, filed on Sep. 30, 2009, now abandoned, which is a continuation-in-part of application No. 11/619,240, filed on Jan. 3, 2007, now abandoned.

(60) Provisional application No. 60/756,070, filed on Jan. 4, 2006.

(51) Int. Cl.

| | | |
|---|---|---|
| *B60R 11/02* | (2006.01) | |
| *G06F 3/147* | (2006.01) | |
| *H04B 1/08* | (2006.01) | |
| *H04N 1/00* | (2006.01) | |
| *H04N 5/44* | (2011.01) | |
| *H04N 7/16* | (2011.01) | |
| *H04N 21/2368* | (2011.01) | |
| *H04N 21/414* | (2011.01) | |
| *H04N 21/434* | (2011.01) | |
| *H04N 21/4363* | (2011.01) | |
| *H04N 21/438* | (2011.01) | |
| *H04N 21/462* | (2011.01) | |
| *H04N 21/61* | (2011.01) | |
| *H04N 5/00* | (2011.01) | |
| *H04N 7/00* | (2011.01) | |
| *H04N 7/18* | (2006.01) | |
| *G06F 1/16* | (2006.01) | |
| *H04W 88/04* | (2009.01) | |
| *B60R 11/00* | (2006.01) | |
| *G06F 3/14* | (2006.01) | |
| *H04N 5/38* | (2006.01) | |

(52) U.S. Cl.
CPC ........ *B60R 11/0252* (2013.01); *G06F 1/1632* (2013.01); *G06F 1/1633* (2013.01); *G06F 1/1654* (2013.01); *G06F 3/147* (2013.01); *H04B 1/082* (2013.01); *H04N 1/00347* (2013.01); *H04N 5/00* (2013.01); *H04N 5/4401* (2013.01); *H04N 7/00* (2013.01); *H04N 7/163* (2013.01); *H04N 7/18* (2013.01); *H04N 21/2368* (2013.01); *H04N 21/41422* (2013.01); *H04N 21/4341* (2013.01); *H04N 21/4382* (2013.01); *H04N 21/43637* (2013.01); *H04N 21/4622* (2013.01); *H04N 21/6131* (2013.01); *H04W 88/04* (2013.01); *B60R 2011/0015* (2013.01); *B60R 2011/0017* (2013.01); *B60R 2011/0045* (2013.01); *B60R 2011/0047* (2013.01); *B60R 2011/0075* (2013.01); *G06F 3/1423* (2013.01); *G09G 2380/10* (2013.01); *H04N 5/38* (2013.01); *H04N 2201/0041* (2013.01); *H04N 2201/0058* (2013.01); *H04N 2201/0089* (2013.01)

(56) References Cited

U.S. PATENT DOCUMENTS

| | | |
|---|---|---|
| 8,162,395 B2 | 4/2012 | Vitito |
| 2003/0137584 A1 | 7/2003 | Norvell et al. |
| 2004/0092145 A1 | 5/2004 | Sasame et al. |
| 2004/0227372 A1* | 11/2004 | Lavelle ............... B60N 2/4876 296/37.15 |
| 2005/0204596 A1 | 9/2005 | Peng |
| 2007/0164609 A1 | 7/2007 | Shalam et al. |
| 2007/0199028 A1 | 8/2007 | Yau |
| 2008/0157574 A1 | 7/2008 | LaRussa |
| 2009/0115233 A1 | 5/2009 | Tuccinardi et al. |
| 2010/0067884 A1 | 3/2010 | Schedivy |
| 2011/0049943 A1 | 3/2011 | Liu |
| 2011/0131358 A1* | 6/2011 | Ganesh ............... G01C 21/265 710/304 |
| 2011/0134601 A1 | 6/2011 | Sa |
| 2011/0267759 A1 | 11/2011 | Abram et al. |
| 2015/0131226 A1 | 5/2015 | Tranchina et al. |

OTHER PUBLICATIONS

Office Action for U.S. Appl. No. 14/605,101 Dated Feb. 13, 2015.
Office Action for U.S. Appl. No. 14/605,101 Dated Aug. 28, 2015.
Office Action mailed Mar. 28, 2014 for U.S. Appl. No. 13/586,418.
Written Opinion dated Mar. 8, 2013 for International Appl. No. PCT/US12/70883.
International Search Report mailed Mar. 8, 2013 corresponding to PCT/US12/70883.
International Search Report dated Mar. 2, 2017 for International Application No. PCT/US2016/067862.

\* cited by examiner

VEHICLE ENTERTAINMENT TABLET UNIT AND CRADLE

CROSS-REFERENCE TO RELATED APPLICATIONS

This application is a Continuation application of U.S. application Ser. No. 14/605,101, filed on Jan. 26, 2015, which is a Continuation Application of U.S. application Ser. No. 13/340,946, filed on Dec. 30, 2011, which is a Continuation-in-Part Application of U.S. application Ser. No. 12/851,433, filed on Aug. 5, 2010, which is a Continuation-in-Part Application of U.S. application Ser. No. 12/570,517, filed on Sep. 30, 2009, which is a Continuation-in-Part Application of U.S. application Ser. No. 11/619,240, filed on Jan. 3, 2007, which claims priority to and the benefit of Provisional Application Ser. No. 60/756,070, filed on Jan. 4, 2006, the contents of which are herein incorporated by reference in their entirety.

TECHNICAL FIELD

The present disclosure relates to a vehicle entertainment tablet unit, and more particularly to a vehicle entertainment tablet unit configured to be mounted in a cradle in a vehicle.

DISCUSSION OF RELATED ART

As society becomes more mobile and spends a greater amount of time traveling and away from home, demand rises for electronic devices that can be used outside the home environment. Tablet computers including a large display screen and a touch screen interface, such as the Apple® iPad®, are becoming more prevalent in today's society due to the ease in which they can be used in a mobile environment. However, using a tablet computer in a vehicle may be cumbersome. For example, it may be tiresome to hold a tablet while in a vehicle during a long trip. Further, it may be impracticable for more than one person to simultaneously view content (e.g., movies, television shows, Internet content) on a tablet, or share data and content between multiple tablets while traveling in a vehicle. It may also be impracticable to charge the tablet during use while traveling in a vehicle.

BRIEF SUMMARY

According to an exemplary embodiment of the present disclosure, a vehicle entertainment system includes a tablet unit and a cradle. The tablet unit includes a display and a touch screen input device disposed on a front surface, a first electrical connection, a first mounting mechanism, and a wireless receiver. The wireless receiver is configured to receive media data from a wireless network and the touch screen input device is configured to receive input from a user. The cradle is disposed in a headrest in a vehicle and includes a second electrical connection and a second mounting mechanism. The tablet unit is electrically connected to the cradle via the first and second electrical connections, and is physically coupled to the cradle via the first and second mounting mechanisms upon mounting the tablet unit to the cradle.

According to an exemplary embodiment of the present disclosure, a cradle for a tablet unit is mounted in a vehicle and includes a rear surface, a lip, and a connection port. The lip extends outward from the rear surface, and the connection port is disposed on the lip. A depth of the cradle is defined by a distance between the rear surface and a portion of the lip furthest from the rear surface, and is between about 0.25 inches and about 0.6 inches. The connection port is configured to matingly receive a connector of a tablet unit and supply power to the tablet unit.

According to an exemplary embodiment of the present disclosure, a vehicle entertainment system includes a media control box disposed in a vehicle, a tablet unit, a cradle, and a display mounted in the vehicle. The media control box includes a storage device configured to store media data, and a wireless transmitter configured to transmit the media data. The tablet unit includes a display disposed on a front surface, a wireless receiver, a first electrical connection, and a first mounting mechanism. The cradle is disposed in the vehicle and includes a second electrical connection and a second mounting mechanism. The tablet unit is electrically connected to the cradle via the first and second electrical connections, and is physically coupled to the cradle via the first and second mounting mechanisms upon mounting the tablet unit to the cradle. The display is mounted within the vehicle and includes a wireless receiver. The wireless receiver of the tablet unit and the wireless receiver of the display are configured to receive the media data transmitted by the media control box via a WI-FI DIRECT connection.

BRIEF DESCRIPTION OF THE SEVERAL VIEWS OF THE DRAWINGS

The above and other features of the present disclosure will become more apparent by describing in detail exemplary embodiments thereof with reference to the accompanying drawings, in which.

DETAILED DESCRIPTION

Exemplary embodiments of the present disclosure now will be described more fully hereinafter with reference to the accompanying drawings. This disclosure, may however, be embodied in many different forms and should not be construed as limited to embodiments set forth herein.

Exemplary embodiments of the present disclosure relate to a vehicle entertainment tablet unit for a vehicle. For example, the vehicle entertainment tablet unit may include a display screen mounted in a vehicle, such as an automobile, minivan or sport utility vehicle (SUV). The vehicle entertainment tablet unit may receive an Internet connection, provide a wireless connection to wireless enabled devices in and around the vehicle, and transmit and receive multimedia content from wireless enabled devices in and around the vehicle.

Figure 1A:
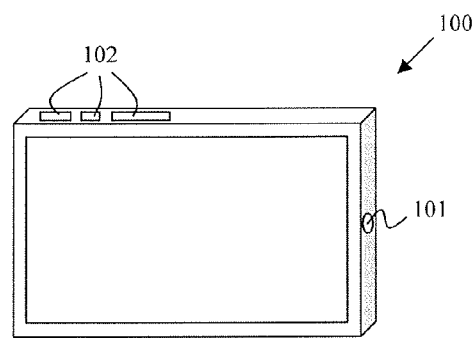
FIG. 1A shows a front view of a vehicle entertainment tablet unit, according to an exemplary embodiment of the present disclosure.
Figure 1B:
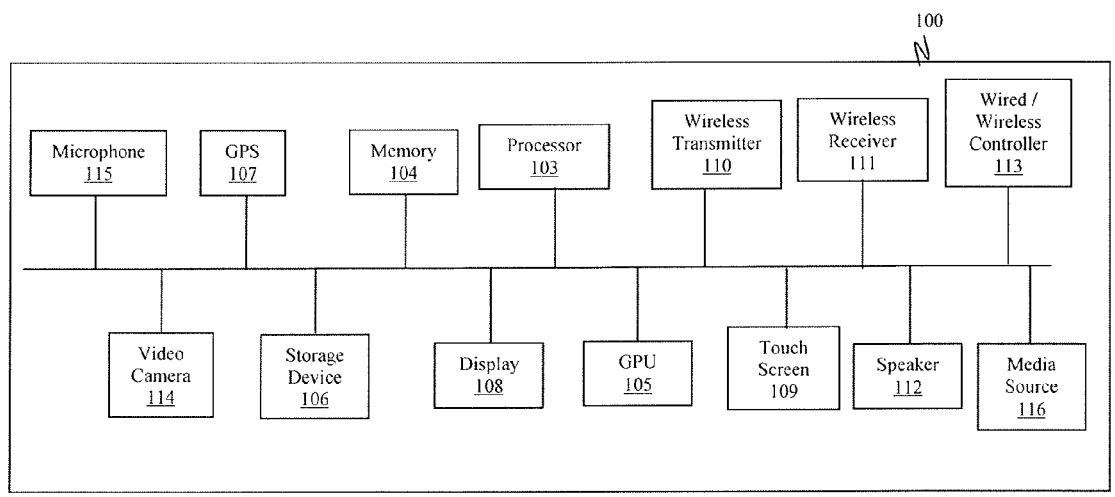
FIG. 1B is a block diagram showing the components of a vehicle entertainment tablet unit, according to an exemplary embodiment of the present disclosure.

FIG. 1A shows a front view of a vehicle entertainment tablet unit, according to an exemplary embodiment. FIG. 1B is a block diagram showing the components of the vehicle entertainment tablet unit, according to an exemplary embodiment.

Referring to FIG. 1A, a vehicle entertainment tablet unit 100 may include at least one control button 101 and a variety of connection ports 102. The control button(s) 101 and the connection ports 102 may be disposed at any location on the vehicle entertainment tablet unit 100. For example, the control button(s) 101 and connection ports 102 may be disposed on a side of the unit 100, on a front surface of the unit 100, or on a back surface of the unit 100. At least one of the control buttons 101 may also be embodied as a switch, or any other physical device capable of passing input to the vehicle entertainment tablet unit 100. The vehicle entertainment tablet unit 100 may be controlled using a combination of the control button(s) 101 and a touch screen input device. The control button(s) 101 may function as an on/off switch, and/or may be used to perform a variety of other functions on the vehicle entertainment tablet unit 100 such as, for example, accessing a menu on the unit 100, waking the unit 100, or turning off the display on the unit 100. The connection ports 102 may include, but are not limited to, a USB port (e.g., a microUSB port or a mini-USB port), an HDMI port (e.g., a micro-HDMI port), an SD card slot (e.g., a micro-SD card slot, a mini-SD card slot, or a standard SD card slot), and/or an Ethernet port. The vehicle entertainment tablet unit 100 may further include a battery supplying power to the unit 100. In an exemplary embodiment, the vehicle entertainment tablet unit 100 may function as a media player capable of presenting video and/or audio programs to a user. In an exemplary embodiment, the vehicle entertainment tablet unit 100 may include additional features, functions, and options.

Referring to FIG. 1B, the vehicle entertainment tablet unit 100 may include, for example, a processor 103 (e.g., a single core or multi-core processor), a memory 104 (e.g., RAM), a graphics processing unit (GPU) 105, a storage device 106 (e.g., flash memory), a global positioning system (GPS) radio 107, a display 108, a touch screen input device 109, a wireless transmitter 110, a wireless receiver 111, and/or a speaker 112. The display 108 may be, for example, a TFT-LCD display, and may be a variety of sizes (e.g., between about 5 inches and about 15 inches). The touch screen input device 109 is an electronic visual display that allows for the detection of touches within a display area. The location of the touch screen input device 109 corresponds to the location of the display 108 on the vehicle entertainment tablet unit 100, and may be used to detect touches made by, for example, a finger, a hand, or a stylus. The touch screen input device 109 may be, for example, a capacitive touch screen panel or a resistive touch screen panel, however the touch screen input device 109 is not limited thereto. The touch screen input device 109 may be used to present a variety of input means to a user to allow the user to enter input to the vehicle entertainment tablet unit 100. For example, software on the vehicle entertainment tablet unit 100 may be used to present a virtual keyboard or keypad to a user, allowing for the input of text and numbers, and/or may accept touch gestures that perform various functions on the unit 100. The unit 100 may run various operating systems such as, for example, the Android™ operating system. The wireless transmitter 110 and receiver 111 may utilize a variety of wireless transmission standards including, but not limited to, cellular, BLUETOOTH, radio frequency (RF), infrared (IR), or 802.11 (e.g., 802.11a/b/g/n) transmission standards. The vehicle entertainment tablet unit 100 may include multiple wireless receivers and transmitters, which allows the unit 100 to utilize a variety of wireless transmission standards.

Wireless enabled devices may include, but are not limited to, a cellular phone (e.g., a smartphone), a tablet computer, a laptop, an mp3 player, a gaming system, or a personal digital assistant (PDA).

The vehicle entertainment tablet unit 100 may be positioned in any number of locations in a vehicle. For example, the vehicle entertainment tablet unit 100 may be mounted to a seat in a vehicle, within a headrest of a seat in a vehicle, positioned overhead in a vehicle, mounted in the dashboard or center console of a vehicle, or in any other convenient location of a vehicle. The unit 100 may be detachably or fixedly mounted at any of these locations. The mounting of the vehicle entertainment tablet unit 100 is described in more detail below with reference to FIGS. 2A-2D, 3-4, and 7A-7B.

The vehicle entertainment tablet unit 100 provides functions similar to tablet computers such as, for example, the Apple® iPad®. For example, a user may use the vehicle entertainment tablet unit 100 to access the Internet, view video content such as movies or television shows, or listen to audio content such as music or podcasts. Depending on the operating system installed on the vehicle entertainment unit 100, a user may also have access to an application store such as, for example, the Android™ Market, allowing the user to utilize a variety of applications on the vehicle entertainment tablet unit 100.

In an exemplary embodiment, the vehicle entertainment tablet unit 100 may function as a hotspot. For example, the vehicle entertainment tablet unit 100 may establish an Internet connection using the wireless receiver 111 via a Third Generation (3G) or Fourth Generation (4G) cellular network such as, for example, a High Speed Packet Access (HSPA) network, an Evolved High-Speed Packet Access (HSPA+) network, a Long Term Evolution (LTE) network, or a Worldwide Interoperability for Microwave Access (Wi-MAX) network. The Internet connection established by the wireless receiver 111 may then be shared with the wireless transmitter 110, which may assign an Internet Protocol (IP) address to each of the wireless enabled devices in and around the vehicle. The IP addresses may be assigned to the wireless enabled devices using, for example, an 802.11 transmission standard (e.g., 802.11a/b/g/n). The assignment of IP addresses to the wireless enabled devices by the wireless transmitter 110 allows the vehicle entertainment tablet unit 100 to function as a hotspot by creating an Internet-enabled wireless local area network (e.g., a Wi-Fi network) in and around the vehicle.

Exemplary embodiments may include a single wireless receiver 111 or multiple wireless receivers, which enables the connection to various types of cellular networks (e.g., a first wireless receiver may connect to a 3G network and a second wireless receiver may connect to a 4G network). Further, exemplary embodiments may include a single wireless transmitter 110 or multiple wireless transmitters. Multiple wireless transmitters may be utilized to provide separate wireless local area networks. The utilization of separate wireless local area networks allows for a greater coverage area of the hotspot. For example, larger vehicles such as, for example, buses, trains and airplanes may implement additional wireless transmitters to expand the coverage area of a hotspot. Providing separate wireless local area networks also results in the availability of additional bandwidth which can be used to provide Internet access to a large number of wireless enabled devices. Further, separate wireless local area networks may be utilized to offer connections of varying security/access levels for different groups of users.

Figure 9:
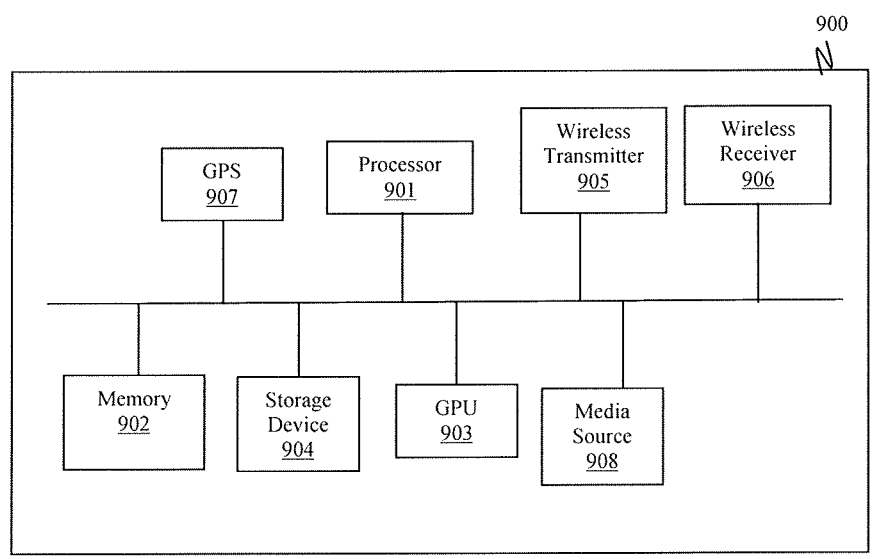
FIG. 9 is a block diagram showing the components of a media control box, according to an exemplary embodiment of the present disclosure.

The inclusion of the wireless receiver 111 and the ability of the vehicle entertainment tablet unit 100 to be mounted in a cradle in a vehicle allows the unit 100 to function as a stand-alone vehicle entertainment device. For example, in an exemplary embodiment, the vehicle entertainment tablet unit 100 receives media content using the wireless receiver 111 via a wireless network (e.g., a cellular network), and displays the received media content without interfacing with any other devices in the vehicle. Alternatively, in an exemplary embodiment, the vehicle entertainment tablet unit may receive media content via a media box disposed within the vehicle, as discussed with reference to FIG. 9.

The wireless local area network provided by the wireless transmitter 110 may utilize an 802.11 transmission standard (e.g., 802.11a/b/g/n). Various security techniques may be utilized to provide a secure wireless local area network. For example, the wireless local area network may implement Wired Equivalent Privacy (WEP) security, Wi-Fi Protected Access (WPA, WPA2) security, MAC address filtering, port filtering, and the ability to disable Service Set Identifier (SSID) broadcasting. These security settings can be accessed by a user via a user interface, which may be accessible via the display 108 of the vehicle entertainment tablet unit 100, or a wireless enabled device connected to the wireless local area network.

In an exemplary embodiment, the vehicle entertainment tablet 100 unit may receive an Internet connection via another device functioning as a hotspot.

The vehicle entertainment tablet unit may include at least one speaker 112 for outputting audio. Additional speaker(s) may also be located separate from the vehicle entertainment tablet unit 100, and may be connected to the unit 100 via an electrical or wireless connection such as, for example, a BLUETOOTH, radio frequency (RF), infrared (IR), or 802.11 (e.g., 802.11a/b/g/n) wireless connection.

The GPS radio 107 of the vehicle entertainment tablet unit 100 may allow the vehicle entertainment tablet unit 100 to function as a navigation device. For example, the vehicle entertainment tablet unit 100 may provide services such as, for example, location-based searching and turn-by-turn navigation by utilizing the GPS radio 107, a data connection, and software installed on the vehicle entertainment tablet unit 100.

A wired or wireless controller 113 may be used to control the vehicle entertainment tablet unit 100. The controller 113 may control all functions of the vehicle entertainment tablet unit 100 including, for example, multimedia functions and Internet functions. A wireless controller may utilize software installed on the vehicle entertainment tablet unit 100, and may communicate with the vehicle entertainment tablet unit 100 using, for example, BLUETOOTH, radio frequency (RF), infrared (IR), or 802.11 (e.g., 802.11a/b/g/n) transmission standards. A wired controller may connect to the vehicle entertainment tablet unit 100 via one of the connection ports (e.g., a USB port) on the unit 100.

In an exemplary embodiment, a video camera 114 and/or a microphone 115 may be connected to the vehicle entertainment tablet unit 100. The video camera 114 and/or microphone 115 may be disposed on the vehicle entertainment tablet unit 100 or may be located separate from the unit 100 and connected to the unit 100 via a wired or wireless connection such as, for example, a radio frequency (RF), infrared (IR), BLUETOOTH, or 802.11 (e.g., 802.11a/b/g/n) connection. The video camera 114 and microphone 115 can be utilized with the speaker(s) 112 under control of the processor 103, and when connected to the Internet, may provide Voice over IP (VOIP) and videoconferencing functionality.

The video camera 114, microphone 115 and/or speaker(s) 112 may be positioned together or separately, and can be positioned in any number of locations in a vehicle. For example, the video camera 114, microphone 115, and/or speaker(s) 112 may be integrated with the vehicle entertainment tablet unit 100 or may be located separate from the unit 100, or may be mounted in a seat, headrest, overhead, dashboard or center console of the vehicle, or in any other convenient location of the vehicle. In addition to videoconferencing functionality, the video camera 114 and microphone 115 may be used to record and store video data in the storage device 106 of the vehicle entertainment tablet unit 100. A video camera 114 disposed in a rear seat may also be utilized by a driver or a passenger in another seat to monitor a child sitting within the field of view of the video camera 114. This monitoring may be done via a vehicle entertainment tablet unit 100 in the vehicle, a display, or a wireless enabled device connected to the local area network.

The wired or wireless controller 113 may be used to control functions of the video camera 114, microphone 115, and/or speaker(s) 112. For example, the controller 113 can be used to enter and exit VOIP or videoconferencing mode, enable the video camera 114, microphone 115, and/or speaker(s) 112, control the volume of the speaker(s) 112, disable the video camera 114, microphone 115, and/or speaker(s) 112, or change recording options of the video camera 114 and/or microphone 115.

In an exemplary embodiment, the vehicle entertainment tablet unit 100 may communicate with a plurality of video cameras, microphones, and/or speakers, and functions of each video camera, microphone, and/or speaker may be controlled by the same controller or a separate controller. The video cameras, microphones, and/or speakers may further be controlled by the wireless enabled devices connected to the wireless local area network using, for example, software installed on the wireless enabled devices.

In an exemplary embodiment, a media source 116 may be connected to the vehicle entertainment tablet unit 100. The media source 116 may be part of the vehicle entertainment tablet unit 100, may be located within a cradle configured to receive the vehicle entertainment tablet unit 100, or may be located separate from the vehicle entertainment tablet unit 100 and the cradle. The media source 116 may be connected via a connection port 102 on the vehicle entertainment tablet unit 100, or wirelessly via, for example, a BLUETOOTH, radio frequency (RF), infrared (IR), or 802.11 (e.g., 802.11 a/b/g/n) connection. The media source 116 may be, for example, a DVD player, a CD-ROM player, a video game player, a videocassette player, a television tuner, a radio tuner, an MP3 player, a digital video recorder (DVR), and/or a device for playing media supplied from a portable storage device (e.g., a portable hard drive, memory cards, flash memory sticks, key drives, thumb drives).

Audio and video signals may be transmitted from the vehicle entertainment tablet unit 100 to other displays and/or speaker(s) located within the vehicle, receivers connected to a vehicle radio, wireless headphones, or wireless enabled devices connected to the wireless local area network. The audio and video signals may be transmitted wirelessly by the wireless transmitter 110 using, for example, radio frequency (RF), infrared (IR), BLUETOOTH, or 802.11 (e.g., 802.11a/b/g/n) transmission standards.

The vehicle entertainment tablet unit 100 may be detachably or fixedly mounted to a cradle in a vehicle, which may be positioned in a variety of locations within the vehicle. For example, a cradle configured to receive and secure the vehicle entertainment tablet unit 100 may be mounted within a headrest of a seat in a vehicle, within a seat back of a seat in a vehicle, in an overhead position within a vehicle, or in any other convenient location of a vehicle.

FIGS. 2A-2D show a vehicle entertainment unit, and a cradle mounted within a headrest of a seat in a vehicle and configured to receive the vehicle entertainment unit.

Figure 2A:
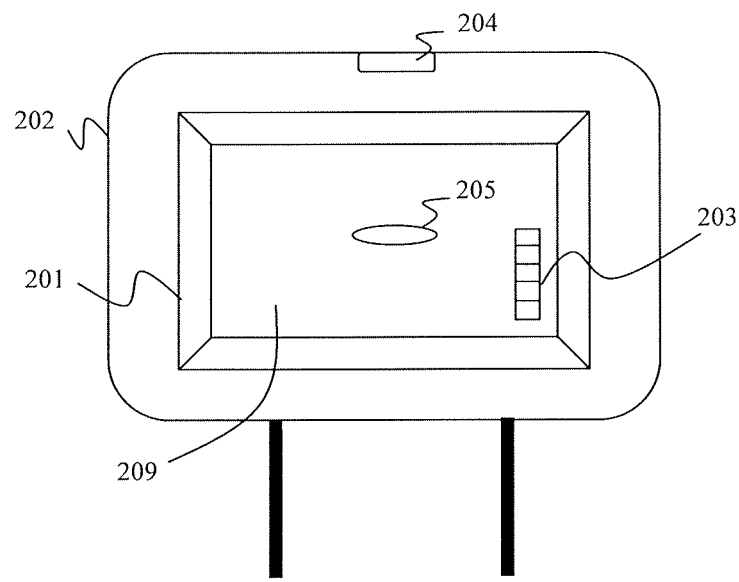
FIGS. 2A-2D show a vehicle entertainment tablet unit, and a cradle mounted within a headrest of a seat in a vehicle and configured to receive the vehicle entertainment tablet unit, according to an exemplary embodiment of the present disclosure.
Figure 8:
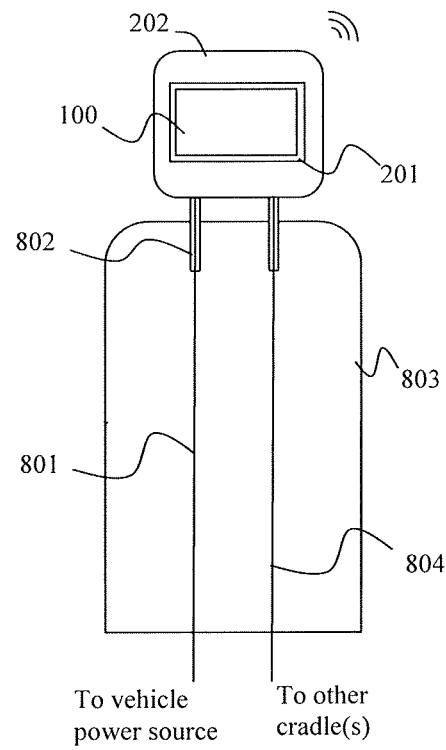
FIG. 8 shows a power wire and a data wire connecting to a cradle in a headrest in a vehicle, according to an exemplary embodiment of the present disclosure.

FIG. 2A shows a cradle 201 disposed in a headrest 202 of a seat in a vehicle, and shaped and dimensioned to receive the vehicle entertainment tablet unit 100, according to an exemplary embodiment. The cradle 201 may include an electrical connection 203 that can be used to electrically couple the vehicle entertainment tablet unit 100 to the cradle 201. The electrical connection 203 may be, for example, a plurality of electrical contacts or a pin connector. The cradle 201 may be electrically connected to a power source in the vehicle, and the electrical connection 203 in the cradle 201 may be utilized to supply power to the vehicle entertainment tablet unit 100 when docked. For example, as shown in FIG. 8, the cradle 201 may be connected to a vehicle power source via a power wire(s) 801 connecting to the electrical connection 203 in the cradle 201 and passing through a headrest post 802 and the seat 803. The power wire(s) 801 may pass through a single headrest post 802 or multiple headrest posts 802. When multiple cradles are present in a vehicle, a data wire(s) 804 may connect the electrical connections in the cradles to each other, and may facilitate the transmission of data between docked vehicle entertainment tablet units. The data wire(s) 804 may pass through a single headrest post 802 of the same seat 803 or multiple headrest posts 802 of the same seat 803.

Figure 2B:
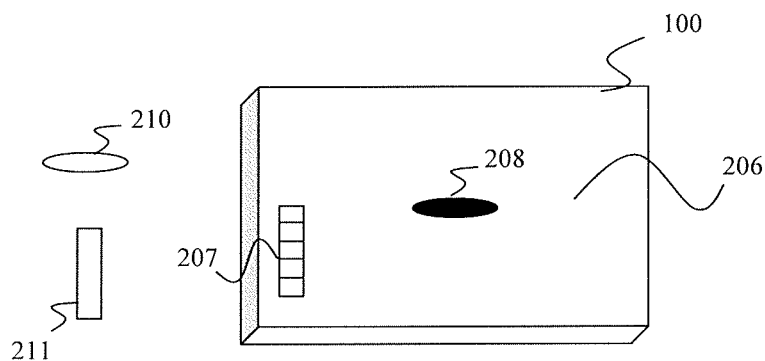

The cradle 201 may further include a hinge mechanism allowing the vehicle entertainment tablet unit 100 to be pivoted in vertical and/or horizontal directions, and a mounting mechanism configured to allow the vehicle entertainment tablet unit 100 to be detachably removed from the cradle 201 in an exemplary embodiment. The hinge mechanism is described in more detail with reference to FIG. 4. The mounting mechanism may be, for example, a quick release mount mechanism, and may utilize a variety of selectively releasable coupling structures. For example, as shown in FIGS. 2A and 2B, the mounting mechanism may include a release button 204 disposed on a surface of the headrest 202 and a latch member 205 disposed on a rear surface 209 of the cradle 201. The release button 204 is actuated to rotate the latch member 205 and permit removal of the vehicle entertainment tablet unit 100 from the cradle 201. Insertion of the vehicle entertainment tablet unit 100 within the headrest 202 is achieved by setting the vehicle entertainment tablet unit 100 within the cradle 201 and applying sufficient force to the vehicle entertainment tablet unit 100 for overcoming the rotational force of the latch member 205 to force the vehicle entertainment tablet unit 100 into a secure position.

FIG. 2B shows a rear surface 206 of the vehicle entertainment tablet unit 100, which is configured to be mounted within the cradle 201 shown in FIG. 2A, according to an exemplary embodiment. In FIG. 2B, the vehicle entertainment tablet unit 100 includes a cooperating electrical connection 207 configured to be electrically coupled to the electrical connection 203 of the cradle 201, and a cooperating mounting mechanism 208 configured to be coupled to the latch member 205 of the cradle 201. In an exemplary embodiment, optional covers 210, 211 may be included to cover the cooperating electrical connection 207 and the mounting mechanism 208 of the vehicle entertainment tablet unit 100 when the unit 100 is not coupled to the cradle.

Figure 2C:
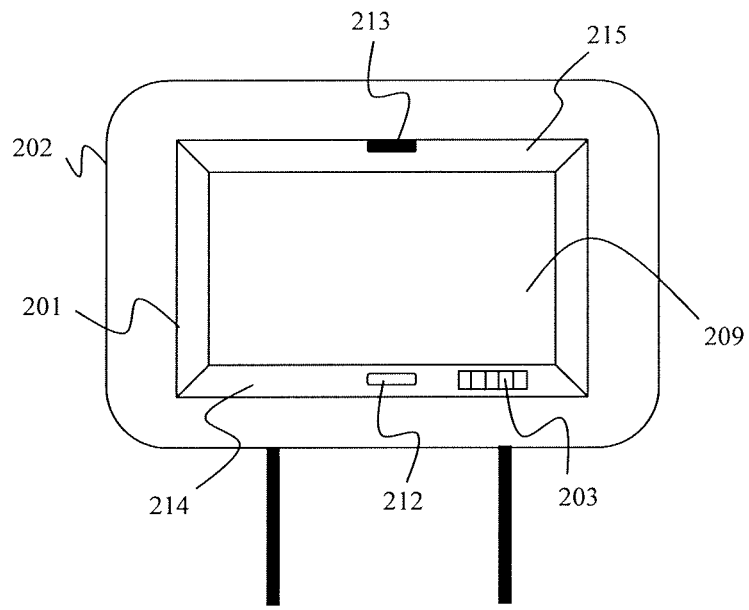

In an exemplary embodiment, the mounting mechanism on the cradle 201 may include a recess 212 and a latch member 213, as shown in FIG. 2C. The recess 212 and latch member 213 may have a variety of shapes, and may be disposed on the cradle 201 in a variety of locations. For example, in the exemplary embodiment shown in FIG. 2C, the recess 212 is disposed on a first lip 214 of the cradle 201 and the latch member 213 is disposed on a second lip 215 of the cradle, which opposes the first lip 214. The electrical connection 203 of the cradle is disposed on the first lip 214. A depth of the cradle 201 may be defined by the distance between the rear surface 209 of the cradle 201 and the outermost portion of the lips 214, 215 of the cradle 201. Due to the thinness of the vehicle entertainment tablet unit 100, the depth of the cradle 201 may be between about 0.25 inches and about 0.6 inches, however the depth is not limited thereto. The mounting mechanism on the vehicle entertainment tablet unit 100 may include a tab 216 disposed on a first edge 217 of the unit 100 and a coupling member (not shown) disposed on a second edge (not shown) of the unit 100, which opposes the first edge 217. Upon mounting the vehicle entertainment tablet unit 100 into the cradle 201, the tab 216 is inserted into the recess 212, and the coupling member on the second edge of the vehicle entertainment tablet unit 100 engages the latch member 213 of the cradle 201, locking the unit 100 into place. The electrical connection 207 of the unit 100 is electrically coupled to the electrical connection 203 of the cradle 201 upon mounting. The vehicle entertainment tablet unit 100 may be fixedly or removably mounted to the cradle 201. When the unit 100 is removably mounted, a portion of the latch member 213 on the cradle 201 may be exposed, allowing a user to remove the unit 100 from the cradle 201 by actuating the latch member 213. When mounted, the vehicle entertainment tablet unit 100 may be substantially flush with the outer surface of the headrest 202.

Figure 2D:
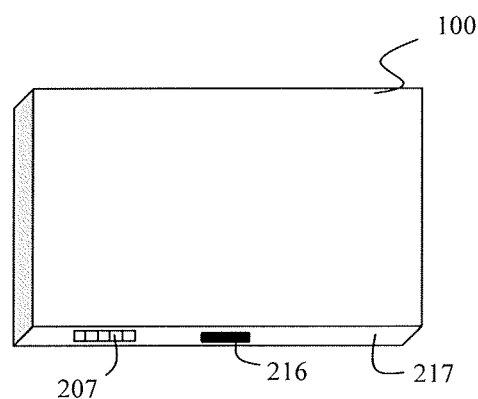

The mounting mechanisms and electrical connections shown in FIGS. 2A-2D may be disposed in a variety of locations. For example, in FIGS. 2A-2B, the release button 204 may be disposed in any area of the headrest 202, the latch member 205 and electrical connection 203 may be disposed in any area of the rear surface 209 of the cradle 201, and the cooperating mounting mechanism 208 and electrical connection 207 of the vehicle entertainment tablet unit 100 may be disposed in any corresponding area of the rear surface 206 of the unit 100. In FIGS. 2C-2D, the recess 212 and electrical connection 203 may be disposed in any area of any lip of the cradle 201, the latch member 213 may be disposed in any area of an opposing lip of the cradle 201, the tab 216 and electrical connection 207 of the vehicle entertainment tablet unit 100 may be disposed in any corresponding area of any edge of the unit 100, and the coupling member (not shown) of the unit 100 may be disposed on an opposing edge of the unit 100. Alternatively, the electrical connection 203 may be disposed on the same lip as the latch member 213, and the electrical connection 207 may be disposed on the same edge as the coupling member (not shown).

Figure 3:
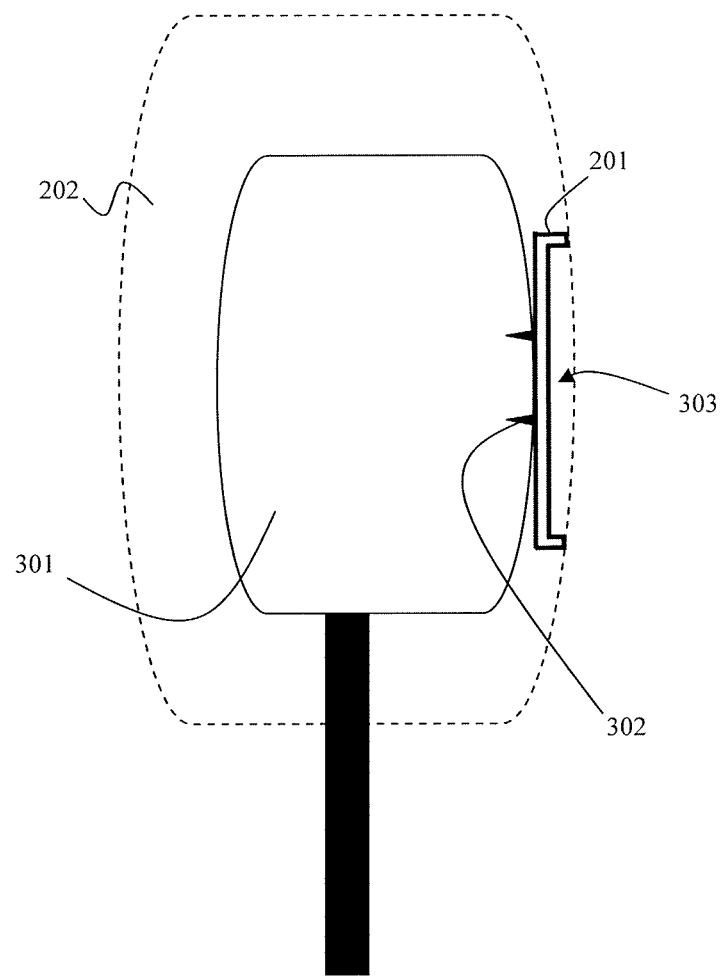
FIG. 3 is a side view showing a cradle mounted to a headrest in a vehicle, according to an exemplary embodiment of the present disclosure.

FIG. 3 is a side view showing a cradle mounted within a headrest.

As shown in FIG. 3, the cradle 201 is secured to the headrest 202. In an exemplary embodiment, the cradle 201 may be secured to an internal headrest support structure 301 of the headrest 202 using, for example, a fastener 302, screw, nail, or adhesive, however the method of securing the cradle 201 to the headrest 202 is not limited thereto. The cradle 201 includes a receiving portion 303 shaped and dimensioned to receive the vehicle entertainment tablet unit 100. Due to the thinness of the vehicle entertainment tablet unit 100, the depth of the receiving portion 303 may be between about 0.25 inches and about 0.6 inches, however the depth is not limited thereto.

Figure 4:
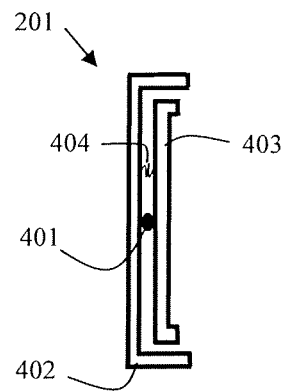
FIG. 4 is a side view of a cradle including a hinge mechanism, according to an exemplary embodiment of the present disclosure.

In an exemplary embodiment, the cradle 201 may include a hinge mechanism 401 that permits the vehicle entertainment tablet unit 100 to be pivoted in vertical and/or horizontal directions, as shown in FIG. 4. For example, in the exemplary embodiment shown in FIG. 4, the cradle 201 includes a base portion 402, a receiving portion 403, and a hinge mechanism 401 connecting the receiving portion 403 to the base portion 402. The base portion 402 may be secured to an internal headrest support structure 301 of a headrest 202 as described with reference to FIG. 3, and the vehicle entertainment tablet unit 100 may be secured into the receiving portion 403 as described with reference to FIGS. 2A-2D (e.g., the receiving portion 403 may include an electrical connection 203 and a mounting mechanism such as latch members 205 and 213 and/or recess 212). The receiving portion 403 may be electrically connected to the base portion 402 via a wire 404 connecting the two portions. The hinge mechanism 401 permits the receiving portion 403 to pivot with respect to the base portion 402 in horizontal and/or vertical directions, allowing for the adjustment of the viewing angle of the vehicle entertainment tablet unit 100 when mounted. The hinge mechanism 401 may be a ball-like mechanism located near the center of the cradle 201 and permitting the receiving portion 403 to pivot about a number of axes, as shown in FIG. 4, however the shape and location of the hinge mechanism 401 is not limited thereto.

Figure 5:
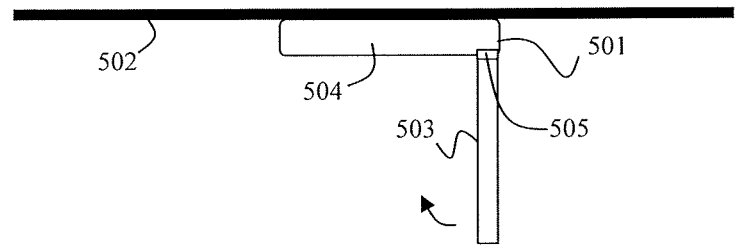
FIG. 5 shows a cradle mounted in an overhead position in a vehicle and configured to receive a vehicle entertainment tablet unit, according to an exemplary embodiment of the present disclosure.

FIG. 5 shows a cradle 501 disposed in an overhead position and configured to receive the vehicle entertainment tablet unit 100, according to an exemplary embodiment. The cradle 501 is attached to the ceiling 502 of a vehicle. The cradle 501 may be recessed within the ceiling 502, or may extend below the ceiling 502, as shown in FIG. 5. Due to the thinness of the vehicle entertainment tablet unit 100, the cradle 501 may have a thin profile. For example, the cradle 501 may have a thickness between about 0.25 inches and about 0.6 inches, however the thickness is not limited thereto. The cradle 501 may include a receiving portion 503 configured to detachably or fixedly receive the vehicle entertainment tablet unit 100 in a manner similar to the one described with reference to FIGS. 2A-2D. For example, the receiving portion 503 may include an electrical connection that can be used to electrically couple the vehicle entertainment tablet unit 100 to the receiving portion 503 of the cradle 501. The electrical connection may be, for example, a plurality of electrical contacts or a pin connector. The cradle 501 may further include a hinge mechanism 505 allowing the vehicle entertainment tablet unit 100 to be pivoted into the base portion 504 of the cradle 501 when the vehicle entertainment tablet 100 unit is mounted and not in use. The hinge mechanism 505 may be located in an upper area of the receiving portion 503 of the cradle 501. The receiving portion 503 may include an additional hinge mechanism permitting the vehicle entertainment tablet unit 100 to be pivoted in a vertical and/or horizontal direction, allowing for further adjustment of the viewing angle of the vehicle entertainment tablet unit 100. For example, in an exemplary embodiment, the receiving portion 503 may include the base portion 402, the receiving portion 403, and the hinge mechanism 401 described with reference to FIG. 4. The cradle 501 may further include a mounting mechanism configured to allow the vehicle entertainment tablet unit 100 to be detachably mounted to and removed from the cradle 501. The mounting mechanism may be, for example, a quick release mount mechanism, and may utilize a variety of selectively releasable coupling structures. For example, the mounting mechanisms described with reference to FIGS. 2A-2D may be utilized.

Figure 6:
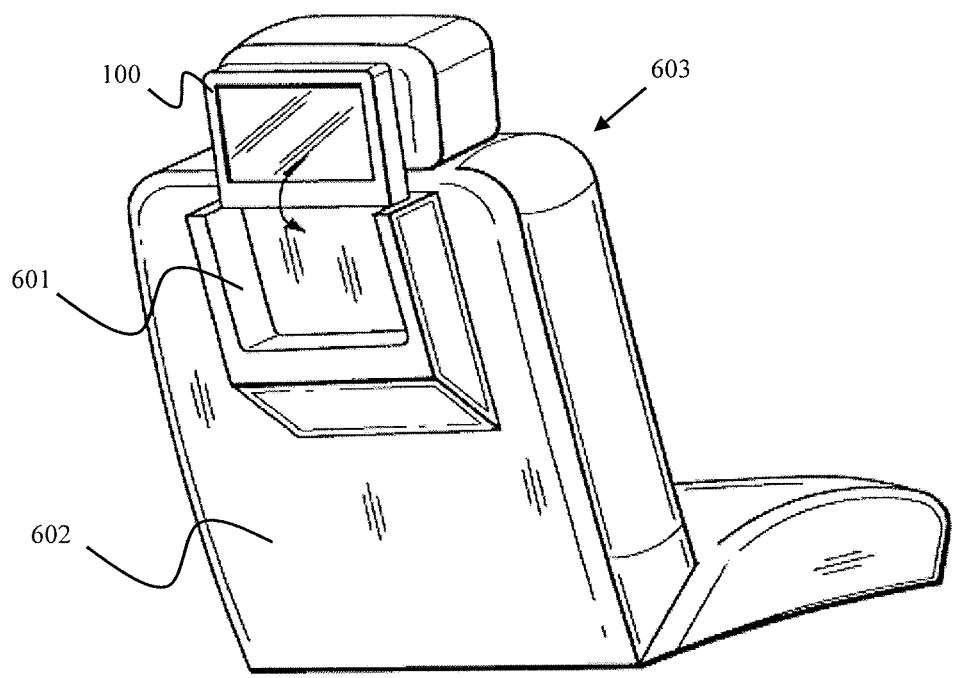
FIG. 6 shows a cradle mounted within a seat back of a seat in a vehicle and configured to receive a vehicle entertainment tablet unit, according to an exemplary embodiment of the present disclosure.

FIG. 6 shows a cradle 601 disposed on a seat back 602 of a seat 603 in a vehicle, and configured to receive the vehicle entertainment tablet unit 100, according to an exemplary embodiment. The vehicle entertainment tablet unit 100 may slide vertically into the cradle 601, or may pivotally attach to the cradle 601 such that it is rotated between a display position and a storage position. The vehicle entertainment tablet unit 100 may be pivotally attached to the cradle 601 using a hinge mechanism operating in a manner similar to the hinge mechanism 505 described with reference to FIG. 5. The cradle 601 may be recessed within the seat back 602, or may extend from the seat back 602, as shown in FIG. 6. In an exemplary embodiment, the cradle 601 may be embedded into a seat mold that is designed to replace the existing backseat mold of a seat in a vehicle. Due to the thin nature of the vehicle entertainment tablet unit 100, the cradle 601 may have a thin profile. For example, the cradle 601 may have a thickness between about 0.25 inches and about 0.6 inches, however the thickness is not limited thereto. The cradle 601 may include an electrical connection and mounting mechanisms similar to those described with reference to FIGS. 2A-2D.

In an exemplary embodiment, the vehicle entertainment tablet unit 100 may function as a multimedia sharing unit. For example, once connected to the wireless local area network, wireless enabled devices may access multimedia data stored on the vehicle entertainment tablet unit 100. This multimedia data may include, for example, movies, television shows, music and pictures, and may include both real-time and non-real-time content. Connected wireless enabled devices may access multimedia data stored in the storage device 106 of the vehicle entertainment tablet unit 100 while the wireless enabled devices are connected to the Internet or while the wireless enabled devices are not connected to the Internet. Connected wireless enabled devices may also transmit and receive data to and from each other while connected to the wireless local area network provided by the vehicle entertainment tablet unit 100.

In an exemplary embodiment, multiple vehicle entertainment tablet units 100 may be mounted in a vehicle. When multiple vehicle entertainment tablet units 100 are present in a vehicle, one of the units 100 may function as a multimedia sharing unit, or multiple vehicle entertainment tablet units 100 may function as multimedia sharing units, allowing media content to be shared freely between all of the units 100, as well as wireless enabled devices present in and around the vehicle. The vehicle entertainment tablet units 100 and the wireless enabled devices may communicate with each other once connected to the same local area network, as described above. In an exemplary embodiment, the vehicle entertainment tablet units 100 and wireless enabled devices may communicate with each other using BLUETOOTH or WI-FI DIRECT transmission standards. WI-FI DIRECT allows the vehicle entertainment tablet units 100 and wireless enabled devices to wirelessly communicate with each other without connecting to a local area network via a hotspot. Displays including a Wi-Fi radio and utilizing WI-FI DIRECT may also be mounted in the vehicle and may communicate with the vehicle entertainment tablet unit(s) 100 and/or wireless enabled devices. The displays may be mounted at the same locations and in the same manner as the vehicle entertainment tablet units 100 as described above.

In an exemplary embodiment, a cradle configured to receive a variety of different tablet units made by different manufacturers may be disposed within a vehicle. For example, the cradle may be a universal cradle configured to receive tablet units such as the Apple® iPad®, or various tablet units running different operating systems such as, for example, the Android™ operating system. The cradle may be disposed in a variety of locations such as, for example, in a seat in a vehicle, within a headrest of a seat in a vehicle, positioned overhead in a vehicle, or mounted in the dashboard or center console of a vehicle. For example, FIG. 7A shows an exemplary embodiment of a cradle mounted in the headrest of a seat in a vehicle, and FIG. 7B shows an exemplary embodiment of a cradle mounted in the back of a seat in a vehicle.

Figure 7A:
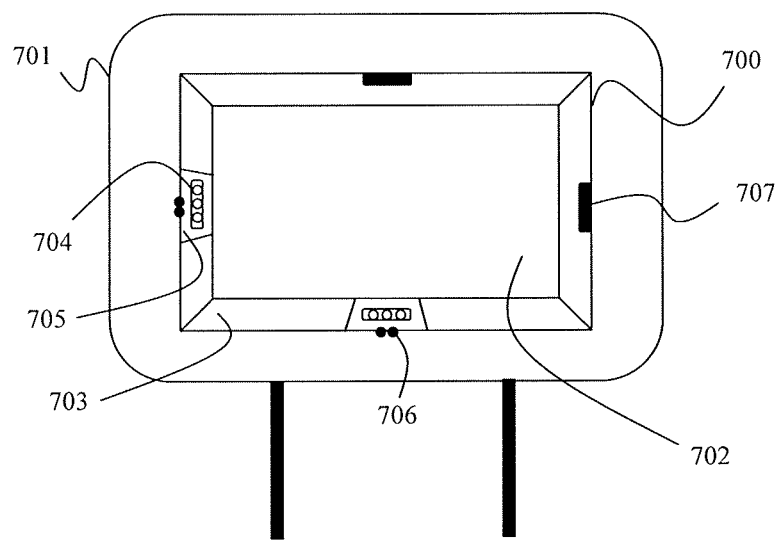
FIG. 7A shows a cradle mounted in a headrest of a seat in a vehicle, according to an exemplary embodiment of the present disclosure.
Figure 7B:
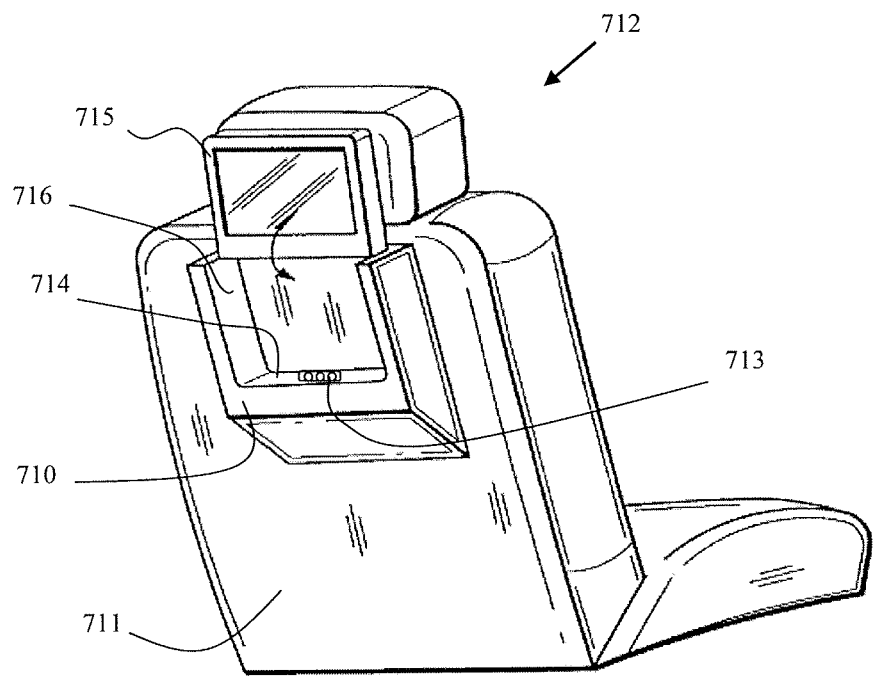
FIG. 7B shows a cradle mounted in the back of a seat in a vehicle, according to an exemplary embodiment of the present disclosure.

Referring to FIG. 7A, a cradle 700 is mounted within a headrest 701 in a vehicle. The cradle 700 includes a rear surface 702 and lips 703 extending outward from the rear surface 701. A depth of the cradle 700 may be defined by the distance between the rear surface 702 and the outermost portion of the lips 703. Due to the thinness of most tablet units, the depth of the cradle 700 may be between about 0.25 inches and about 0.6 inches, however the depth is not limited thereto. A connection port 704 is disposed on a door 705 on a lip 703 of the cradle 700. The connection port 704 is designed to matingly receive a connector of a tablet unit, and may supply power and transmit and receive data to and from the tablet unit, as described above with reference to FIGS. 2A-2D and 8.

In an exemplary embodiment, the cradle 700 may include a single connection port 704. Alternatively, in an exemplary embodiment, multiple connection ports 704 may be disposed on different lips 703 of the cradle 700, as shown in FIG. 7A, allowing the tablet unit to be mounted to the cradle 700 in a landscape orientation or in a portrait orientation, and allowing for the mounting of different tablet units having connectors located in different locations. Each door 705 may be spring-loaded, allowing an unused connection port 704 to be stored beneath the surface of the lip 703 when not in use. For example, pressing a spring-loaded door 705 once may lock the door 705 beneath the surface of a lip 703 when the connection port 704 is not in use, and pressing the door 705 again may unlock the door 705, extending the door 705 from the surface of the lip 703 and allowing for the connection of tablet unit to the connection port 704 via the tablet unit's connector. The connection port 704 may include a variety of connection types adapted to connect to different tablet units such as, for example, a USB port (e.g., a microUSB port or a mini-USB port) or other proprietary connection types such as a 30-pin connector compatible with the Apple® iPad®. The connection port 704 may also be used to matingly receive other mobile devices such as, for example a smartphone.

Each door 705 may include a hinge 706 permitting the door 705 to pivot away from the lip 703 and towards the user. For example, when pivoted away from the lip 703, the door 705 may be substantially parallel to the rear surface 702 of the cradle 700. Pivoting the door 705 away from the lip 703 allows the connector of a tablet unit to be connected to the connection port 704 on the door 705. Once the tablet unit is attached to the cradle via the connection port 704, the door 705 may be pivoted back towards the lip 703, resulting in the tablet unit being disposed within the cradle 700. In an exemplary embodiment, a latch member 707 may be disposed on a lip 703 opposing the connection port 704, and may be utilized to secure the mounted tablet unit in the cradle 700. For example, the latch member 707 may be a door that pivots away from the lip 703 to allow the tablet unit to be accepted into the cradle 700, and towards the lip 703 once the tablet unit is in the cradle 700 to cover a portion of the tablet unit and secure the tablet unit in the cradle 700. The latch member 707 may utilize a hinge similar to the hinge 706 of the door 705 including the connection port 704 to pivot towards and away from the lip 703.

The location of the cradle 700 described with reference to FIG. 7A is not limited to a headrest of a vehicle. For example, the cradle 700 may be positioned overhead in a vehicle (e.g., on the receiving portion 503 of the cradle 501 shown in FIG. 5), in a seat back of a seat in a vehicle, or mounted in the dashboard or center console of a vehicle.

In FIG. 7B, a cradle 710 is disposed on a seat back 711 of a seat 712 in a vehicle, and is configured to receive a variety of tablet units such as, for example, the Apple® iPad®, or various tablet units running different operating systems such as the Android™ operating system. The cradle 710 may include a connection port 713 disposed on a lower lip 714 of the cradle 710. The connection port 713 may include a variety of connection types adapted to connect to different tablet units such as, for example, a USB port (e.g., a microUSB port or a mini-USB port) or other proprietary connection types such as a 30-pin connector compatible with the Apple® iPad®. The connection port 713 may also be used to matingly receive other mobile devices such as, for example a smartphone. A tablet unit 715 may slide vertically into the cradle 710 through an opening opposing the lower lip 714, and a connector on the tablet unit 715 may be coupled to the connection port 713. Side lips 716 disposed adjacent to the lower lip 714 may provide structural support to the tablet unit 715 when the unit 715 is mounted in the cradle 710. The tablet unit 715 may receive power and may transmit and receive data via the connection port 713 as described above in references to FIGS. 2A-2D and 8. In an exemplary embodiment, the cradle 710 may be embedded into a seat mold that is designed to replace the existing backseat mold of the seat 712. Due to the thin nature of most tablet units, the cradle 710 may have a thin profile. For example, the cradle 710 may have a thickness between about 0.25 inches and about 0.6 inches, however the thickness is not limited thereto.

In an exemplary embodiment, a media control box 900 may be mounted within the vehicle and some or all of the vehicle entertainment tablet units 100 may be replaced with displays equipped with a BLUETOOTH radio or a Wi-Fi radio that utilizes WI-FI DIRECT transmission standards. The displays may be mounted at the same locations and in the same manner as the vehicle entertainment tablet units 100 as described above. The media control box 900 may be positioned in any convenient location in the vehicle such as, for example, overhead, under a seat, in a center console, in a dashboard, in a trunk, in a headrest of a seat, or in a seat back of a seat. The media control box 900 may be connected to a power source of the vehicle, and may include, for example, a processor 901 (e.g., a single core or multi-core processor), a memory 902 (e.g., RAM), a graphics processing unit (GPU) 903, a storage device 904 (e.g., flash memory, hard drive), a wireless transmitter 905, a wireless receiver 906, a global positioning system (GPS) radio 907, an internal or external media source 908, and/or a variety of connection ports, as shown in the block diagram in FIG. 9. The connection ports may include, but are not limited to, a USB port (e.g., a microUSB port or a mini-USB port), an HDMI port (e.g., a micro-HDMI port), an SD card slot (e.g., a micro-SD card slot, a mini-SD card slot, or a standard SD card slot), and an Ethernet port. The media control box 900 may communicate with the displays via a wireless connection (e.g., WI-FI Direct, Bluetooth), or may be physically connected to the displays via wires. For example, wires connecting the media control box 900 to the displays may extend from the media control box 900 and through a seat back and headrest posts of a seat to connect to a display, in a manner similar to the power wire(s) 801 and data wires 804 as described with reference to FIG. 8. The media control box 900 may be used to transmit media to any of the displays, or any wireless enabled device in and around the vehicle. In addition, when the vehicle is within the range of a user's home network, the media control box 900 may connect to the home network via Wi-Fi to sync, transmit and/or receive media to and from devices in the user's home. In an exemplary embodiment, rather than being embodied as a stand-alone unit, the media control box 900 may be integrated with a display mounted in the vehicle.

In an exemplary embodiment, the media control box 900 may be permanently mounted within a vehicle. Alternatively, the media control box 900 may be a portable unit that can be moved between vehicles. The portable unit, for example, may mount and electrically connect to a docking station in a vehicle in a manner similar to the mounting of the vehicle entertainment tablet unit 100 into a cradle 201, as described with reference to FIGS. 2A-2D, 5-6, and 7A-7B.

In an exemplary embodiment, software installed on the vehicle tablet unit 100 or display may allow the vehicle entertainment tablet unit 100 or display to communicate with the vehicle head unit and control functions of the vehicle such as, for example, the vehicle's radio, GPS system, and/or air conditioning and heating system. Communication with the vehicle head unit may be carried out via a wired connection or a wireless connection, as described above.

Having described embodiments for a vehicle entertainment tablet unit and cradle, it is noted that modifications and variations can be made by persons skilled in the art in light of the above teachings. It is therefore to be understood that changes may be made in exemplary embodiments of the disclosure, which are within the scope and spirit of the disclosure as defined by the appended claims. Having thus described exemplary embodiments of the disclosure with the details and particularity required by the patent laws, what is claimed and desired protected by Letters Patent is set forth in the appended claims.

What is claimed is:

1. A vehicle entertainment system, comprising:
   a tablet unit comprising a display and a touch screen input device disposed on a front surface, a first electrical connection, a first mounting mechanism, and a wireless receiver, wherein the wireless receiver is configured to receive media data from a wireless network and the touch screen input device is configured to receive input from a user; and
   a cradle configured to be connected to a headrest of a vehicle and comprising a second electrical connection and a second mounting mechanism, wherein the tablet unit is electrically connected to the cradle via the first and second electrical connections, and is physically coupled to the cradle via the first and second mounting mechanisms upon mounting the tablet unit to the cradle,
   wherein the second mounting mechanism comprises a latch member and a release button,
   wherein the latch member is coupled to the first mounting mechanism and the first electrical connection is electrically coupled to the second electrical connection upon mounting the tablet unit to the cradle,
   wherein the front surface of the tablet unit is substantially flush with the outer surface of the headrest upon mounting the tablet unit to the cradle,
   wherein the first electrical connection and the first mounting mechanism are disposed on a rear surface of the tablet unit, and the second electrical connection is disposed on the rear surface of the cradle.

2. The vehicle entertainment system of claim 1, wherein the tablet unit is a first tablet unit and the cradle is a first cradle, and the first tablet unit is configured to share data with a second tablet unit mounted in and electrically connected to a second cradle via an electrical connection made between the first and second cradles,
   wherein the first and second cradles are located separate from each other in the vehicle.

3. The vehicle entertainment system of claim 1, wherein the cradle comprises a rear surface and a lip extending outward from the rear surface, a depth of the cradle is defined by a distance between the rear surface and a portion of the lip furthest from the rear surface, and the depth is between about 0.25 inches and about 0.6 inches.

4. The vehicle entertainment system of claim 1, wherein the cradle is connected to a power source in the vehicle and the tablet unit receives power from the cradle via the first and second electrical connections.

5. The vehicle entertainment system of claim 1, wherein the tablet unit further comprises a wireless transmitter configured to create a hotspot by assigning an Internet Protocol (IP) address to at least one wireless enabled device via an 802.11 transmission standard.

6. The vehicle entertainment system of claim 1, wherein the tablet unit further comprises:
   a storage device configured to store media data; and
   a wireless transmitter configured to transmit the media data to at least one wireless enabled device.

7. The vehicle entertainment system of claim 1, further comprising:
   a first cover configured to cover the first mounting mechanism; and a second cover configured to cover the first electrical connection.

8. The vehicle entertainment system of claim 1, wherein the tablet unit is configured to control a vehicle head unit in the vehicle using software installed on the tablet unit.

9. A vehicle entertainment system, comprising:
   a tablet unit comprising a display and a touch screen input device disposed on a front surface, a first electrical connection, a first mounting mechanism, and a wireless receiver, wherein the wireless receiver is configured to receive media data from a wireless network and the touch screen input device is configured to receive input from a user; and
   a cradle configured to be secured to a seat in of a vehicle and comprising a second electrical connection, a second mounting mechanism, and a latch member, wherein the tablet unit is electrically connected to the cradle via the first and second electrical connections, and is physically coupled to the cradle via the first and second mounting mechanisms upon mounting the tablet unit to the cradle,
   wherein the first mounting mechanism and the first electrical connection are disposed near a same edge of the tablet unit, the second mounting mechanism and the second electrical connection are disposed near a same lip of the cradle, and the latch member is disposed at a top portion of the cradle that is opposite to the lip,
   wherein, upon mounting the tablet unit to the cradle, the first and second mounting mechanisms are physically coupled to each other, the first and second electrical connections are electrically coupled to each other, and the latch member engages the tablet unit at the top portion of the cradle that is opposite to the lip.

10. The vehicle entertainment system of claim 9, wherein the cradle is secured to a headrest of the seat.

11. The vehicle entertainment system of claim 9, wherein the front surface of the tablet unit is substantially flush with an outer surface of the headrest upon mounting the tablet unit to the cradle.

12. The vehicle entertainment system of claim 9, wherein the tablet unit is a first tablet unit and the cradle is a first cradle, and the first tablet unit is configured to share data with a second tablet unit mounted in and electrically connected to a second cradle via an electrical connection made between the first and second cradles,
   wherein the first and second cradles are located separate from each other in the vehicle.

13. The vehicle entertainment system of claim 9, wherein the cradle comprises a rear surface and the lip extending outward from the rear surface, a depth of the cradle is defined by a distance between the rear surface and a portion of the lip furthest from the rear surface, and the depth is between about 0.25 inches and about 0.6 inches.

14. The vehicle entertainment system of claim 9, wherein the cradle is connected to a power source in the vehicle and the tablet unit receives power from the cradle via the first and second electrical connections.

15. The vehicle entertainment system of claim 9, wherein the tablet unit is configured to control a vehicle head unit in the vehicle using software installed on the tablet unit.

16. A vehicle entertainment system, comprising:
   a tablet unit comprising a display and a touch screen input device disposed on a front surface, a first electrical connection, a first mounting mechanism, and a wireless receiver, wherein the wireless receiver is configured to receive media data from a wireless network and the touch screen input device is configured to receive input from a user; and
   a cradle configured to be secured to a seat in of a vehicle and comprising a second electrical connection and a second mounting mechanism, wherein the tablet unit is electrically connected to the cradle via the first and second electrical connections, and is physically coupled to the cradle via the first and second mounting mechanisms upon mounting the tablet unit to the cradle,
   wherein, upon mounting the tablet unit to the cradle, the first and second mounting mechanisms are physically coupled to each other, the first and second electrical connections are electrically coupled to each other, a rear surface of the tablet unit contacts a rear surface of the cradle, and the display is not covered by the cradle.

17. The vehicle entertainment system of claim 16, wherein, upon mounting the tablet unit to the cradle, an entirety of the rear surface of the tablet unit contacts the rear surface of the cradle, and an entirety of the display is not covered by the cradle.

18. The vehicle entertainment system of claim 16, wherein the first mounting mechanism and the first electrical connection are disposed near at least one edge of the tablet unit, and the second mounting mechanism and the second electrical connection are disposed near at least one lip of the cradle.

19. The vehicle entertainment system of claim 16, wherein the cradle is secured to a headrest of the seat.

20. The vehicle entertainment system of claim 19, wherein the front surface of the tablet unit is substantially flush with an outer surface of the headrest upon mounting the tablet unit to the cradle.

* * * * *